(12) United States Patent
Henriksen et al.

(10) Patent No.: US 12,246,503 B2
(45) Date of Patent: *Mar. 11, 2025

(54) EXPANDABLE RIM FOR TIRE TREAD BUFFING APPARATUS AND METHOD

(71) Applicant: BRIDGESTONE BANDAG, LLC, Nashville, TN (US)

(72) Inventors: Eric M. Henriksen, Muscatine, IA (US); Todd R. Frisbie, Muscatine, IA (US); Christopher J. A. Ferrell, Bettendorf, IA (US)

(73) Assignee: Bridgestone Bandag, LLC, Nashville, TN (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/603,148

(22) Filed: Mar. 12, 2024

(65) Prior Publication Data

US 2024/0217196 A1    Jul. 4, 2024

Related U.S. Application Data

(60) Continuation of application No. 17/339,478, filed on Jun. 4, 2021, now Pat. No. 11,951,701, which is a
(Continued)

(51) Int. Cl.
*B29D 30/24* (2006.01)
*B29D 30/26* (2006.01)
*B29D 30/54* (2006.01)

(52) U.S. Cl.
CPC ............. *B29D 30/24* (2013.01); *B29D 30/26* (2013.01); *B29D 30/54* (2013.01); *B29D 2030/549* (2013.01)

(58) Field of Classification Search
CPC ........ B29D 30/24; B29D 30/26; B29D 30/54; B29D 2030/549
(Continued)

(56) References Cited

U.S. PATENT DOCUMENTS

| 442,598 A | 12/1890 | Knight |
|---|---|---|
| 1,110,804 A | 9/1914 | Little |

(Continued)

FOREIGN PATENT DOCUMENTS

| CN | 200998921 | 1/2008 |
|---|---|---|
| CN | 101291800 | 10/2008 |

(Continued)

OTHER PUBLICATIONS

International Search Report and Written Opinion for PCT Application No. PCT/US2016/017926, dated May 9, 2016.
(Continued)

*Primary Examiner* — Hadi Shakeri

(57) ABSTRACT

A machine for retreading tires includes a rotatable hub that includes a moveable conical element, and an expandable rim disposed around the rotatable hub. The expandable rim includes a plurality of shoes. Each shoe of the plurality of shoes may have a base portion and a rim portion. The base portion may have a two-piece construction that allows for replacement of a worn interface that may include a channel and a ramp. A method for assembling an expandable rim for use in a tire retreading machine, and a method for servicing a machine having an expandable rim are also disclosed.

20 Claims, 5 Drawing Sheets

Related U.S. Application Data division of application No. 16/384,760, filed on Apr. 15, 2019, now Pat. No. 11,059,248, which is a division of application No. 15/553,056, filed as application No. PCT/US2016/017926 on Feb. 15, 2016, now Pat. No. 10,343,359.

(60) Provisional application No. 62/126,457, filed on Feb. 28, 2015.

(58) Field of Classification Search
USPC .................................................. 157/1.13
See application file for complete search history.

(56) References Cited

U.S. PATENT DOCUMENTS

| | | | |
|---|---|---|---|
| 2,124,345 A | | 7/1938 | Grange |
| 2,418,584 A | | 4/1947 | Hawkinson |
| 2,921,338 A | | 1/1960 | Edwin |
| 2,960,130 A | | 11/1960 | Smyser |
| 3,770,032 A | | 11/1973 | Smyser |
| 3,997,176 A | | 12/1976 | Wyckoff et al. |
| 4,184,664 A | | 1/1980 | Ouriet et al. |
| 4,781,233 A | | 11/1988 | Williams |
| 4,984,850 A | | 1/1991 | Jensen |
| 5,066,354 A | | 11/1991 | Benjamin |
| 5,354,406 A | | 10/1994 | King et al. |
| 5,518,384 A | | 5/1996 | Presti et al. |
| 5,544,945 A | * | 8/1996 | Daudi ................. B60B 3/10 |
| | | | 301/64.101 |
| 6,251,204 B1 | | 6/2001 | Andersson et al. |
| 6,645,060 B2 | | 11/2003 | Luedeke |
| 7,468,111 B2 | * | 12/2008 | Chapman ............ G01M 17/024 |
| | | | 156/75 |
| 8,075,465 B2 | | 12/2011 | Verfaellie et al. |
| 8,651,498 B2 | | 2/2014 | Timtner et al. |
| 8,800,623 B2 | | 8/2014 | Gardetto et al. |
| 9,623,617 B2 | | 4/2017 | Henriksen |
| 9,724,888 B2 | | 8/2017 | Henriksen et al. |
| 10,343,361 B2 | | 7/2019 | Henriksen |
| 2001/0032899 A1 | | 10/2001 | Champlin |
| 2006/0260727 A1 | | 11/2006 | Chen |

FOREIGN PATENT DOCUMENTS

| | | |
|---|---|---|
| CN | 101456229 | 6/2009 |
| CN | 102834223 | 12/2012 |
| EP | 0 226 967 A1 | 7/1987 |
| EP | 2 441 572 A2 | 4/2012 |
| GB | 2 321 224 | 7/1998 |
| WO | WO-96/40490 A1 | 12/1996 |

OTHER PUBLICATIONS

Kendon National Hubs and Rims, Kendon National Website Description, Nov. 15, 2014.

Notice of Allowance on U.S. Appl. No. 16/384,760, dated Mar. 29, 2021.

Operators Manual & Repair Parts Lists Expanding Hub & Rim Assemblies Website Description, Saf-Tee Siping & Grooving Inc., Nov. 25, 2014.

US Office Action on U.S. Appl. No. 16/384,760, dated Sep. 17, 2020.

* cited by examiner

EXPANDABLE RIM FOR TIRE TREAD BUFFING APPARATUS AND METHOD

CROSS-REFERENCE TO RELATED APPLICATIONS

This application is a continuation of U.S. patent application Ser. No. 17/339,478, filed Jun. 4, 2021, which is a divisional of U.S. patent application Ser, No. 16,384,760, filed Apr. 15, 2019, now U.S. Pat. No. 11,059,248, which is a divisional of U.S. patent application Ser. No. 15/553,056, filed Aug. 23, 2017, now U.S. Pat. No. 10,343,359, which is the U.S. national phase of International Application No. PCT/US2016/017926, filed Feb. 15, 2016, which claims priority to and the benefit of U.S. Provisional Application No. 62/126,457, the contents of each of which are incorporated by reference herein in their entireties.

FIELD OF THE DISCLOSURE

The field relates generally to systems and methods for making retreaded tires and, more particularly, to a method and apparatus for providing an expandable rim suited for mounting a tire or a casing onto a machine.

BACKGROUND

Retreaded tires provide an economical way to gain additional use from tire casings after the original tread or retread has become worn. According to a method of retreading, sometimes referred to as cold process retreading, a worn tire tread and other materials on a used tire are removed to create a buffed, generally textured, treadless surface along the circumference of the tire casing to which a new tread may be bonded.

The tire casing may be inspected for injuries, some of which may be skived and filled with a repair gum while others may be severe enough to warrant rejection of the tire casing. After completion of the skiving process, the buffed surface may be sprayed with a tire cement that provides a tacky surface for application of bonding material and new tread. Next, a layer of cushion gum may be applied to the back, i.e., the inside surface of a new tread, or alternatively, the layer of cushion gum may be applied directly to the tacky surface on the tire casing. There are other methods that may eliminate the need for cement or cushion gum. The cushion gum is a layer of uncured rubber material. The cushion gum and tread may be applied in combination about the circumference of the tire casing to create a retreaded tire assembly for curing. As an alternative, a length of tire tread may be wrapped around the tire casing with the cushion gum already applied. The cushion gum may form the bond between the tread and the tire casing during curing.

Certain retreading processes such as the buffing of the tire casing are carried out on specialized equipment that rotatably mount the casing onto an expandable rim. The expandable rim may include various sections that move radially outwardly with respect to a central hub, for example to expand to a circumference of the rim and sealably engage the beads of the casing, which may be inflated to provide a resilient surface that can be buffed or otherwise processed. The machine may include a rasp that can be applied to the surface of the tire to remove rubber. Because the circumference of a tire casing can more easily be measured by the operator, the desired final radius of the tire casing may be identified in relation to the final circumference of the tire casing.

Expandable rims may experience wear along the interface of the expanding sections and the central hub. That interface, which may include a sliding contact of radially ramped surfaces, may be subject to considerable wear, especially under operating loads where the rim is expanding against the bead of a casing.

SUMMARY

In some embodiments, a machine for retreading tires may include a rotatable hub having a generally conical element that may be displaceable relative to the rotatable hub in an axial direction along a rotation axis. The conical element may form a plurality of ribs. An expandable rim may be disposed around the hub. The expandable rim may include a plurality of shoes arranged symmetrically around the hub in a circumferential direction. Each of the plurality of shoes may include a base portion and a rim portion. The base portion may form a channel that may include a ramp, which may slidably engage a respective rib of the conical element such that the axial displacement of the conical element may cause the shoes to move in a radial direction with respect to the hub towards or away from one another depending on an axial motion and position of the conical element. A belt may be disposed along the rim portion of the plurality of shoes. In some embodiments, the base portion may be formed by connecting a first segment and a second segment. The first segment of the base portion may be connected to the rim portion, and the second segment may be connectable to the first segment so as to form the channel and the ramp.

In some embodiments, a method for assembling an expandable rim for use in a tire retreading machine may include assembling a plurality of shoes so as to form a cylindrical rim structure. Each of the plurality of shoes may be assembled by connecting at least a first segment to a second segment thereof. The first segment may include a rim segment of the shoe. The method may further include placing the cylindrical rim structure around a hub of the machine. The second segment of each shoe may include an interface between each shoe and the hub. The cylindrical rim structure may be secured to the machine around the hub.

In some embodiments, a method for servicing a machine having an expandable rim may include removing a cylindrical rim structure from the machine. The rim structure may be disassembled to separate a plurality of shoes which form the cylindrical rim structure. At least one shoe may be disassembled to separate a shoe interface component from a shoe rim component. A replacement shoe interface component may be provided. The replacement shoe interface component may be connected to the shoe rim component that was previously removed from the machine. The method may further include reassembling the cylindrical rim structure using the replacement shoe interface component, and reconnecting the cylindrical rim structure to the machine.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several implementations in accordance with the disclosure and are therefore, not to be considered limiting of its scope, the disclosure will be described with additional specificity and detail through use of the accompanying drawings.

Figure 1:
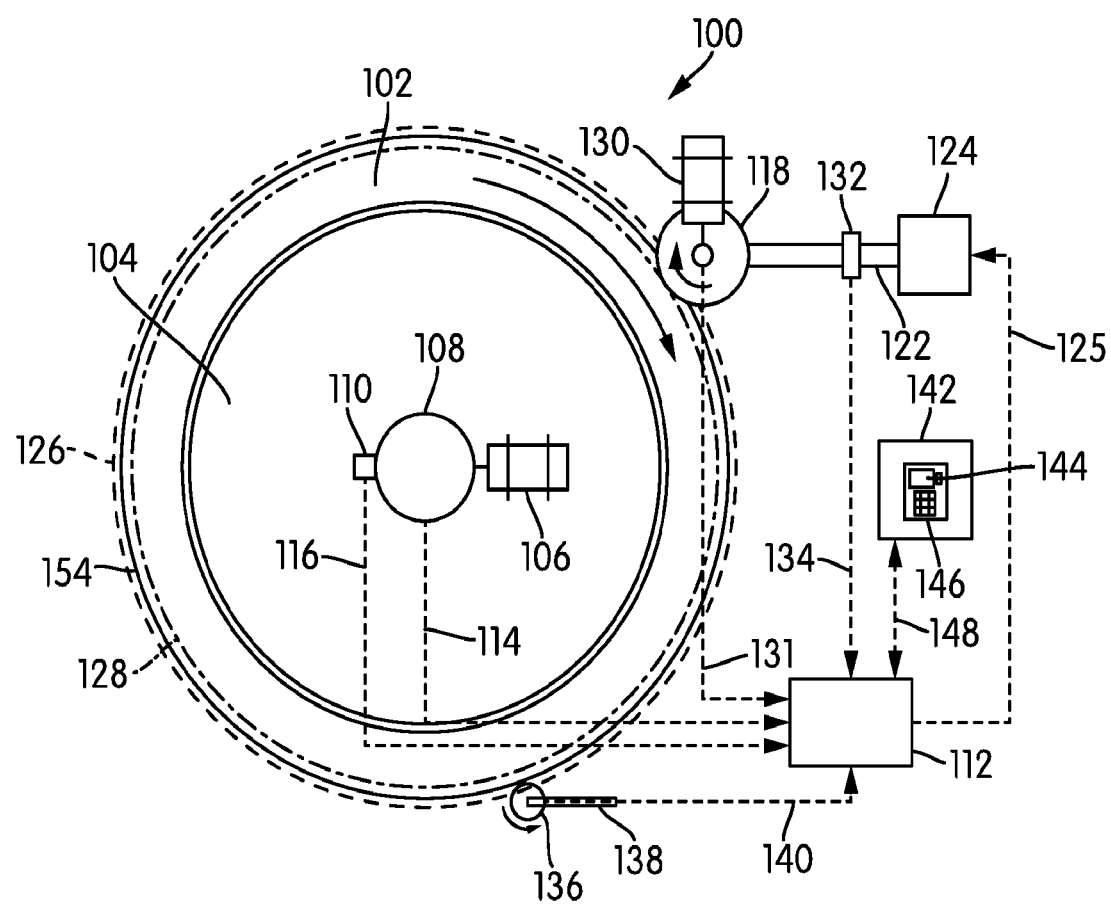
FIG. 1 is a schematic view of a tire buffing system in accordance with the disclosure.

Reference is made to the accompanying drawings throughout the following detailed description. In the drawings, similar symbols typically identify similar components, unless context dictates otherwise. The illustrative implementations described in the detailed description, drawings, and claims are not meant to be limiting. Other implementations may be utilized, and other changes may be made, without departing from the spirit or scope of the disclosure. It will be readily understood that the aspects of the present disclosure, as generally described herein, and illustrated in the figures, can be arranged, substituted, combined, and designed in a wide variety of different configurations, all of which are explicitly contemplated and made part of this disclosure.

DETAILED DESCRIPTION

A buffing machine 100 having a tire 102 mounted on a rotating, expandable rim 104 is shown schematically in FIG. 1. As shown, the machine 100 may be a standalone, dedicated machine for buffing tires prior to a retreading operation, or may alternatively be part of a retreading machine that can perform other operations, such as installing a new tread onto the casing.

During operation, the expandable rim 104 and tire 102 may rotate at a constant angular rate of rotation during operation, for example, 60-90 revolutions per minute (RPM), but may also rotate at a variable speed. An electric motor 106 may be connected to a hub 108 of the expandable rim 104 to provide the rotation of the tire 102, but any other type of rotary actuator may be used, such as hydraulically or pneumatically powered motors, or even mechanical arrangements providing a rotating output. As shown, the hub 108 may include timing features that may be picked up by an angular displacement encoder 110 associated with the machine 100. A control signal of the motor 106 may be provided by an electronic controller 112 via a motor control conduit 114, while information indicative of the rotation of the hub 108 may be provided to the controller 112 by the encoder 110 via a tire rotation information conduit 116.

The machine 100 may further include a buffing tool or rasp 118. The rasp 118 may be any device capable of cutting material from the tire 102 as it rotates. In some embodiments, the rasp 118 may include a laminated steel drum having saw teeth arranged around its outer cylindrical surface. In some embodiments, the rasp 118 may have a length of about 4 inches (10.2 cm) and a diameter of about 8 inches (20.4 cm).

Although many configurations are possible, the rasp 118 may be connected to the machine 100 at the end of an arm 122. A rasp sensor 132 may be communicatively coupled to the rasp motor 130 and the electronic controller 112 via a rasp rpm conduit 134, and may be configured to provide information on rasp 118 rotational speed to the electronic controller 112. The position of the arm 122 and of the rasp 118 relative to the tire 102 may be adjusted by a rasp actuator 124. The rasp actuator 124 may position the rasp 118 head to sweep a circular arc across the face of the tire 102 at a defined radius. A force thus derived may be caused by the interference between the rasp 118 face and the circumference of the tire 102 being buffed. Any other arrangements of the arm, actuator, and other parts of the cutting assembly that are known in the art and incorporated herein. The pressing or normal force of the rasp 118 on the tire 102 effects removal of material from the tire 102 and may be carried out in response to command signals provided by the electronic controller 112 via a rasp actuator control conduit 125. As best shown in FIG. 1, the outer circumference 126 is illustrated by dashed line. In that same figure, the cutting depth 128, which is located radially inward from the outer circumference 126 relative to a center of the tire 102, is shown in dash-dot-dashed line.

The electronic controller 112 may be communicatively coupled to an input panel 142 via an input panel conduit 148. The input panel 142 may include an input device 146 (e.g., an alphanumeric keyboard, switches, buttons, etc.) and a display 144. A user may input commands, for example rasp 118 cutting depth, tire rotation speed, tread pattern, etc. via the input device 146. A cutting depth sensor 136 may include a small rotatable wheel positioned in contact with an outer surface of the tire 102 via a depth sensor mounting arm 138. The cutting depth sensor 136 may be communicatively coupled to the electronic controller 112 via a depth sensor conduit 140. While various sensors included in the buffing machine 100 are depicted as communicatively coupled to the electronic controller 112 via conduits, in some embodiments, each of the sensors, input panel 142 or otherwise electronic components can be wirelessly coupled to the electronic controller 112 (e.g., via Bluetooth®, Wi-Fi, or any other wireless communication protocol).

During a cutting operation, the rasp 118 may be driven by a rasp motor 130 in a counter-rotational direction relative to the tire 102. The rasp motor 130 may be controlled and monitored by the electronic controller 112 through a motor control conduit 131. When the rasp 118 is in position at the cutting depth 128 and the motor 130 is operating, material is removed from the outer portion of the tire 102 as the teeth 120 of the rasp 118 are pressed against the outer circumference 126 of the tire 102. To prevent rotation and to retain the tire 102 firmly on the expandable rim 104 during the cutting operation, the expandable rim 104 may be placed in an expanded position such that a rubber skirt or belt placed around an outer rim thereof sealably engages a bead of the tire 102 to seal the inner cavity of the tire 102 and inflate the tire 102 when air is pumped in its interior.

Figure 2:
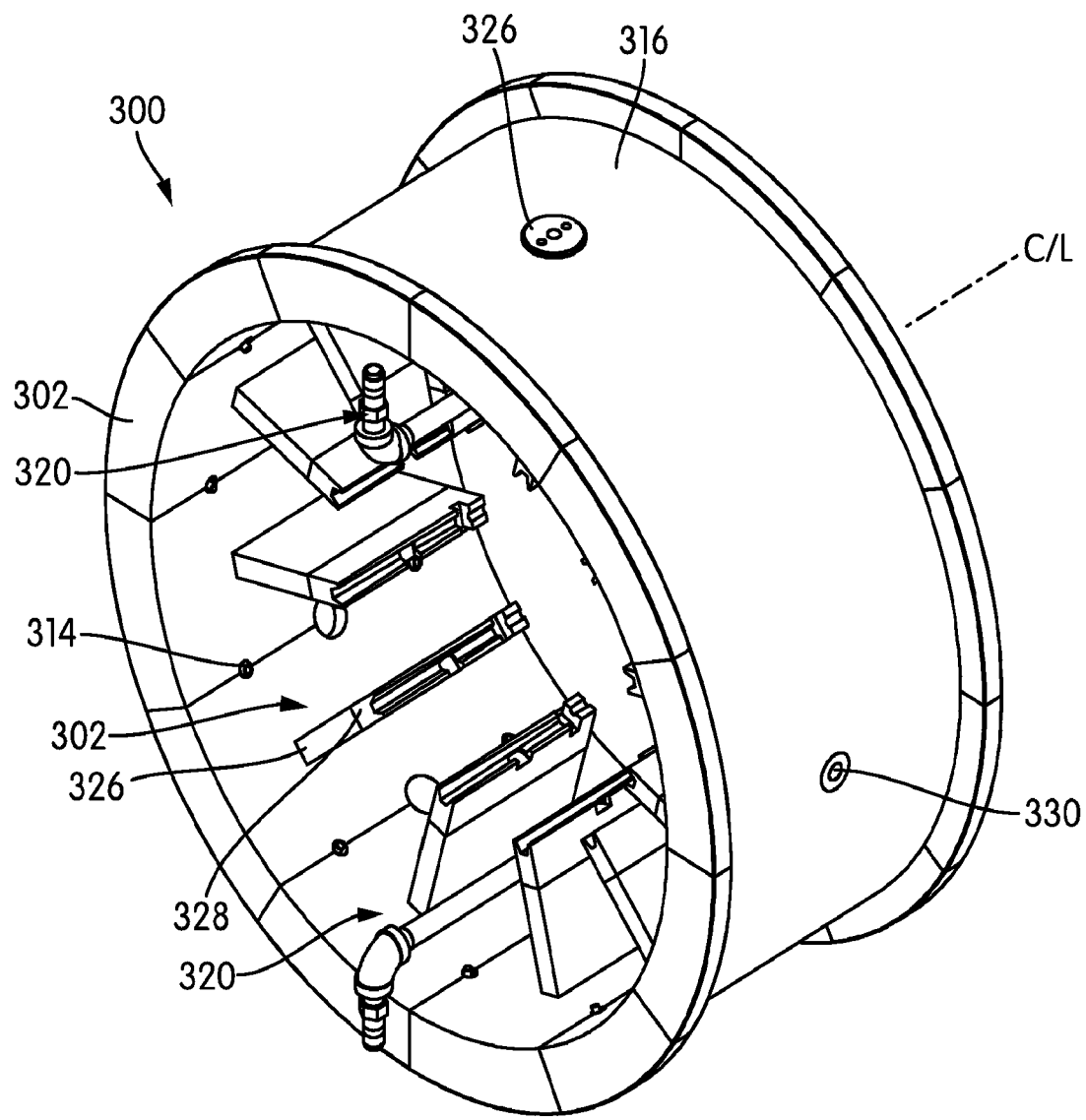
FIG. 2 is a perspective view of an expandable rim according to an embodiment.
Figure 3:
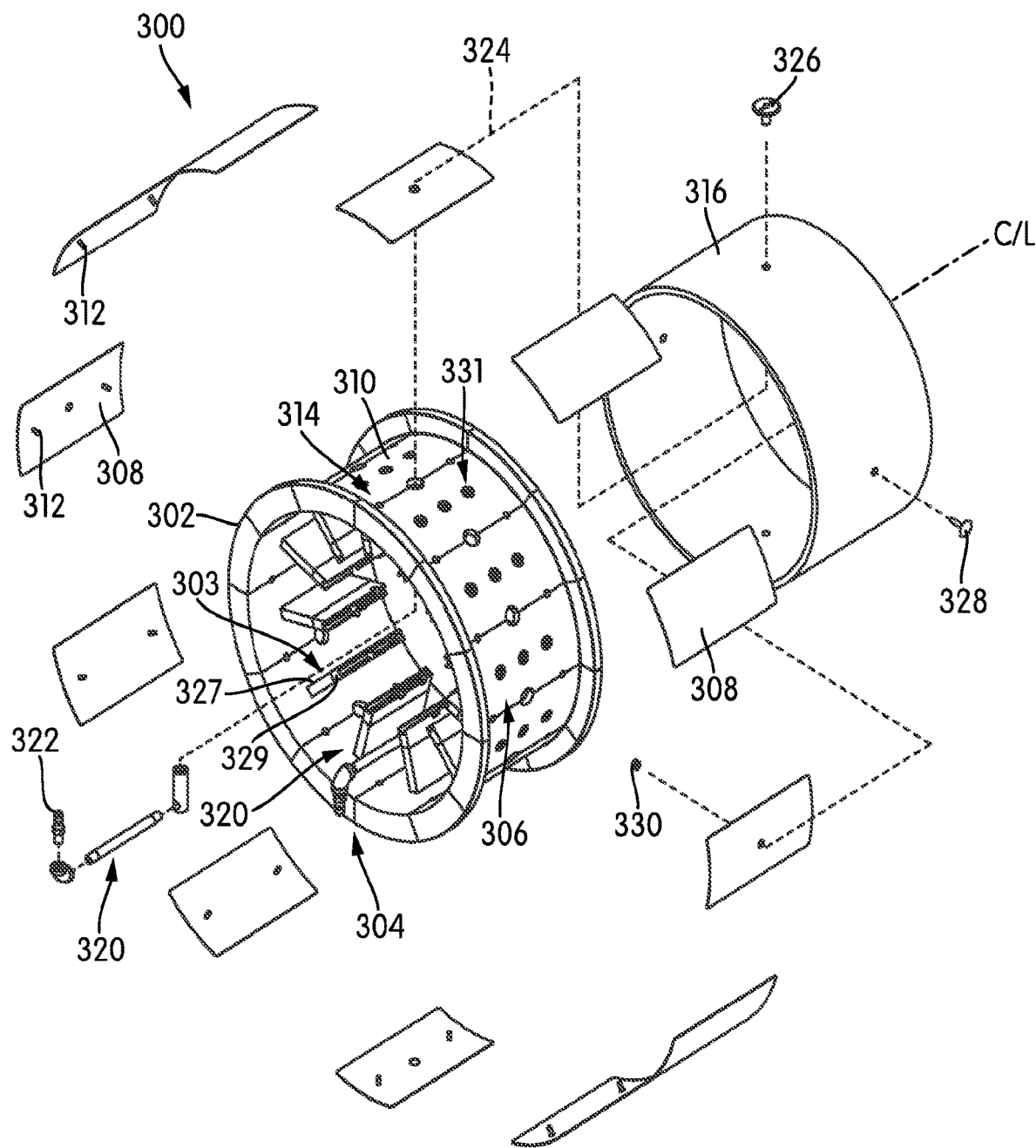
FIG. 3 is an exploded view of an expandable rim assembly of FIG. 2 in accordance with the disclosure.

FIG. 2 shows a perspective view and FIG. 3 shows an exploded view of an expandable rim assembly 300 according to an embodiment. The expandable rim assembly 300 may be associated with a machine (e.g., the buffing machine 100) in much the same way as the expandable rim 104 described above and shown in FIG. 1. It should be appreciated that expandable rims such as the expandable rim assembly 300 may be made in different tire bead size and tire width combinations. Each rim bead size may have an effective bead size range that it can accommodate by virtue of its expanding capability, usually 1.5-2.5 inches. The expandable rim assembly 300 may be configured for use with a hub (e.g., the hub 108), as is well known in the art, which includes surfaces (e.g., conical surfaces) that push radially ramped portions of a plurality of shoes 302 that make up the expandable rim 300 radially outward, thus pushing them apart to expand the expandable rim assembly 300.

In some embodiments, the expandable rim assembly 300 may include the plurality of segmented shoes 302 that, together, may form a cylindrical rim structure 304. Each of the plurality of segmented shoes 302 may extend over an angle around the cylindrical rim structure 304. In some embodiments, the angle may be about 30 degrees, such that twelve shoes complete the cylindrical structure, but other angles and number of shoes 302 may be used. Radially extending slits 306 extending through the cylindrical rim structure 304 may result at the interfaces between adjacent shoes 302. Each slit 306 may be covered by a respective support plate 308, which may have a generally curved shape that may be consistent with an outer drum surface 310 of the cylindrical rim structure 304. In some embodiments, each support plate 308 may form two posts 312, each of which locates the support plate 308 on the outer drum surface 310 by being inserted into a corresponding opening 314 which may be formed by shallow cutouts or detents in the edges of the shoes 302 along the slits 306.

An inner skirt or belt 316 having a generally cylindrical shape may be placed around the outer drum surface 310 so as to cover the outer drum surface 310 of the cylindrical rim structure 304. Although a single belt is shown, more belts having the same or different dimensions as the belt 316 can be used. One or more (two shown) air conduits 320 may provide compressed air to and from a nipple 322 through a series of aligned openings along an air path 324 to an air nozzle 326 that may be disposed within the interior of a tire (e.g., the tire 102) when the tire is mounted onto the expandable rim assembly 300. In this way, the tire can be inflated and deflated, as desired, by providing or evacuating air to/from the air nozzle 326. Bolts 328 that engage nuts 330, or a different fastening arrangement, can be used to retain the belt 316 around the cylindrical rim structure 304 such that the belt 316 may be prevented from rotating relative to the cylindrical rim structure 304 and the shoes 302 may be held together.

Figure 4:
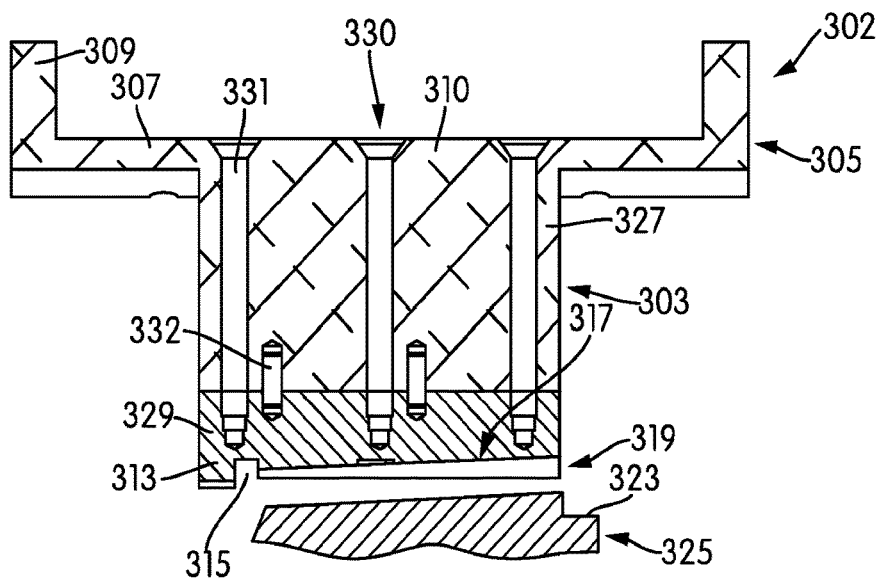
FIG. 4 is a fragmented view of an expandable rim shoe in accordance with the disclosure.
Figure 5:
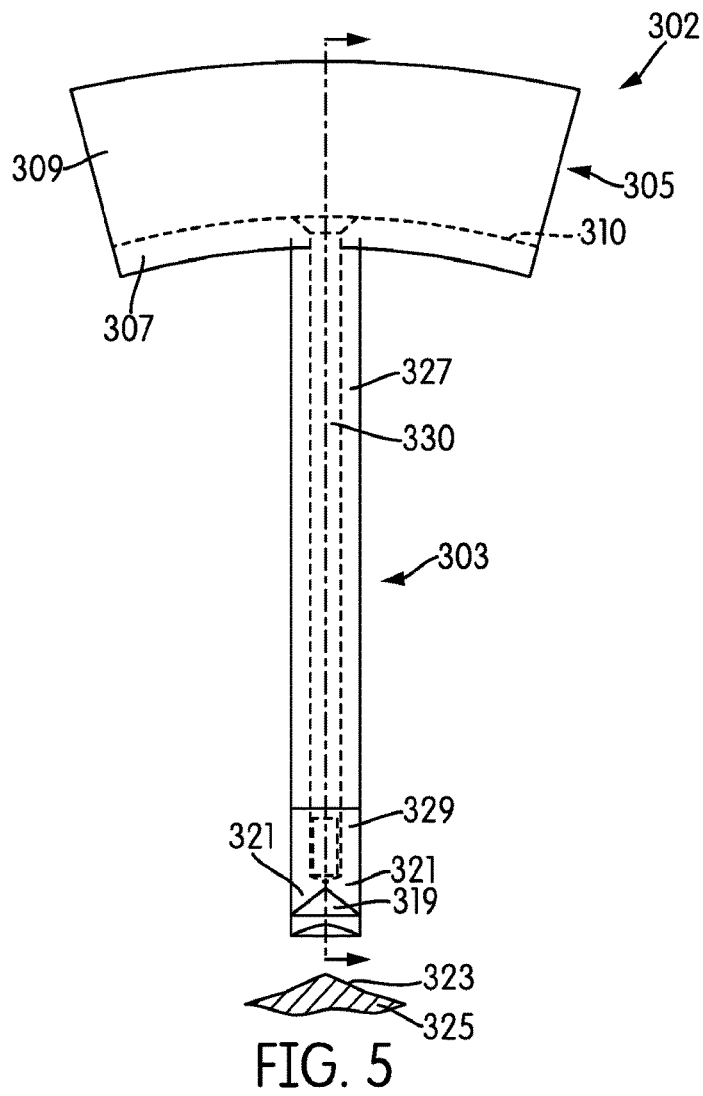
FIG. 5 is an outline view from a front perspective of the expandable rim shoe of FIG. 3.

A fragmented view, from the side, of a shoe 302 of the plurality of shoes 302 included in the expandable rim 300 is shown in FIG. 4 and an outline view from the front of the same is shown in FIG. 5. The shoe 302 may include a base portion 303, which is sometimes referred to as the shank and which may be generally plate-shaped, and a rim portion 305, which defines a circular segment of the expandable rim 300. The rim portion 305 may include a rim segment 307 and a flange segment 309, which together may form a structure having a generally U-shaped cross section, into which a portion of a tire (e.g., the tire 102) may be accommodated using any suitable means. The rim segment 307 may include the outer drum surface 310 onto which other structures may be disposed such as, for example, the support plates 308 and/or portions of the inner belt 316, when the shoe 302 has been assembled into the expandable rim assembly 300.

At the radially inward part of the shoe 302, on the end of the base portion 303, various features may be formed that may facilitate the mounting, retention, and relative motion of the shoe with respect to a conical hub (e.g., the hub 108) when the expandable rim 300 is expanding or contracting during operation. It should be appreciated that although the interface features shown may be common across different expandable rim assemblies, other features than those shown here can be used. As shown in FIG. 4, the end of the base portion 303 that is the furthest away from the rim portion 305 may form a step 313 that is disposed next to a notch 315.

A ramp 317 may be formed at the bottom of a V-shaped channel 319 and may extend away from the end of the base portion 303, towards the rim portion 305, in a direction away from the step 313 along the bottom edge of the base portion 303. In some embodiments, the walls 321 of the channel 319 may not follow the ramp 317.

When the shoe 302 is assembled into the expandable rim assembly 300 the ramp 317 and channel 319 may matingly and slidably engage a rib 323 of a conical element 325 that may actuate the shoe 302 in the known fashion. The conical element 325 may be disposed within a rotatable hub (e.g., the rotatable hub 108) and displace relative thereto, for example, pneumatically, to cause the radial displacement of the shoes. One wear condition with the type of interface between the conical element 325 and the shoe 302 may include sliding wear and degradation of the side faces of the walls 321 around the ramp 317 in the channel 319. In some situations, insufficient lubrication, surface roughness, the presence of debris and/or other factors may affect the longevity, alignment and friction at the interface between the shoe 302 and the conical element 325, which may eventually warrant replacement of the entire shoe 302. In some embodiments, the shoe 302 is made of a two-piece construction such that the base portion 303 may be quickly repaired and/or retrofit to work with different hubs by simply removing a segment thereof that forms the interface between the shoe 302 and the conical element 325 of the hub.

More specifically, as shown in FIGS. 4 and 5, the base portion 303 may include a first segment 327, which is integral with the rim portion 305. The base portion 303 may also include a second segment 329, which may be connected to an end of the first segment 327 that is opposite the rim portion 305. The second segment 329 may entirely form therein various features for engaging the conical element 325 of the hub, for example, the step 313, the notch 315, the ramp 317, the channel 319, and the like.

In the illustrated embodiment, the second segment 329 may be releasably connected to the first segment 327 by a plurality of bolts or fasteners 331 disposed within threaded openings 330 (three openings shown). Although a connection using fasteners is described, any other suitable connection method may be used, including but not limited to welding, pinning, keying and/or other methods. Moreover, the second segment 329 may have any suitable length so as to accommodate the various features interfacing with the hub, or may be longer, for example, taking up the base portion 303 in its entirety. In some embodiments, alignment of the second segment 329 with the first segment 327 may be accomplished by two pins 332.

By using the two-piece construction for the shoe 302, areas of the plurality of shoes 302 that may be prone to wear or damage may be replaced without requiring replacement of the entire shoe 302. In this way, assembly and service of the machine 100 (FIG. 1) may be considerably improved both in terms of time and cost required.

Figure 6:
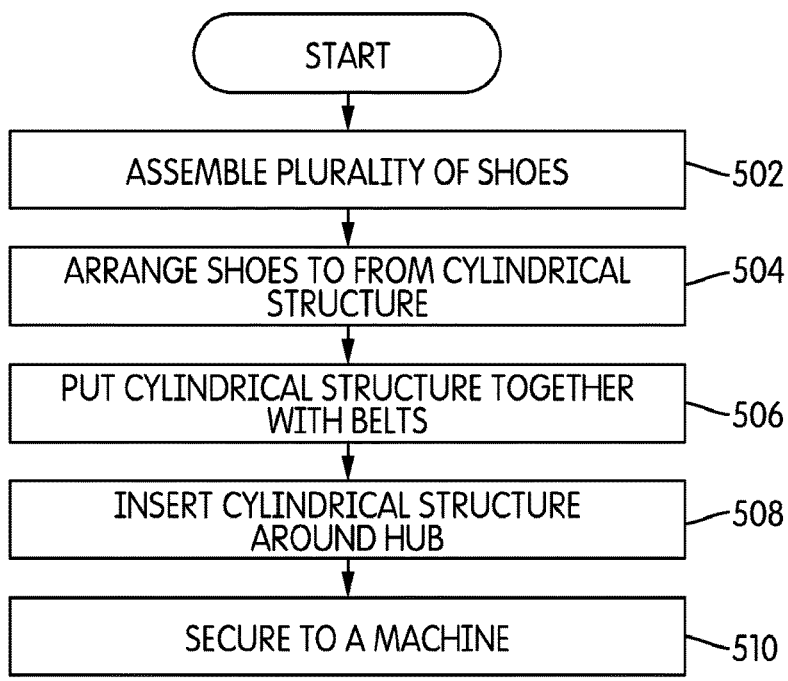
FIG. 6 is a flowchart for a method of assembling an expandable rim in accordance with the disclosure.

A flowchart for a method of assembling an expandable rim in accordance with an embodiment is shown in FIG. 6. At step 502, a plurality of shoes may be assembled. Each of the plurality of shoes (e.g., the plurality of shoes 302) may be assembled out of more than one piece, for example, a first piece that includes a rim segment (e.g., the first segment 327), and a second piece (e.g., the second segment 329) that includes an interface between each shoe and a hub (e.g., the conical element 325 of a hub such as the hub 108). The shoes may be arranged to form a cylindrical structure at 504, and the structure (e.g., the cylindrical rim structure 304) may be put together using one or more belts (e.g., the belt 316) at 506. The assembled structure is inserted around a hub at 508, for example secured around the hub 108, and secured to the machine at 510, for example the machine 100.

Figure 7:
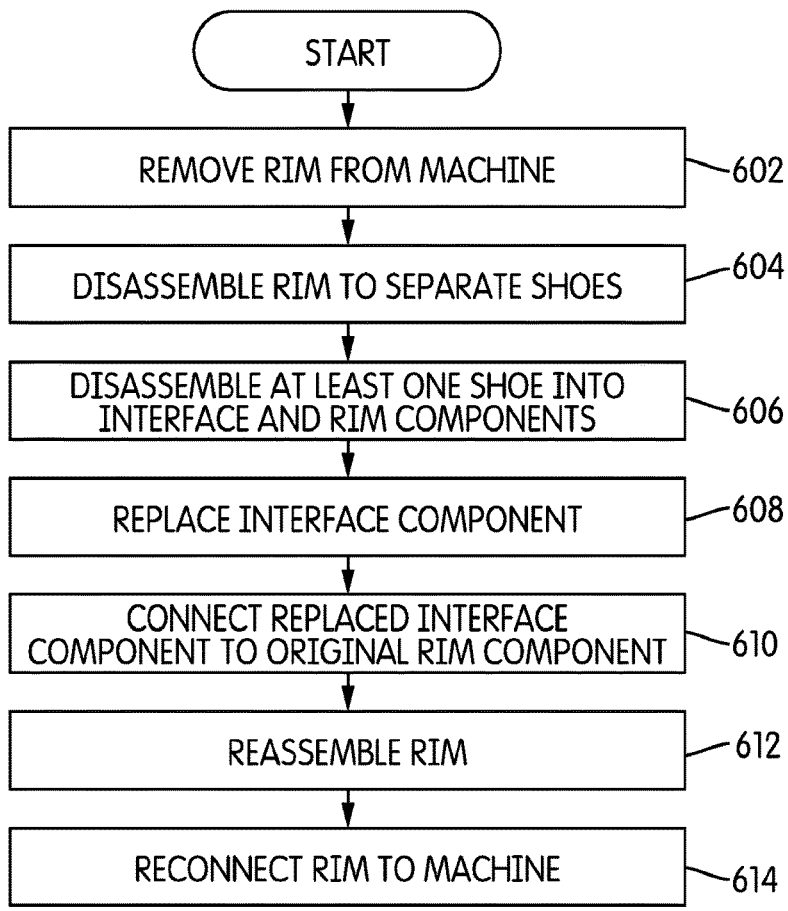
FIG. 7 is a flowchart for a method of servicing an expandable rim in accordance with the disclosure.

A flowchart for a method of servicing a machine having an expandable rim in accordance with an embodiment is shown in FIG. 7. The method may include removing a cylindrical rim structure from the machine at 602. For example, the cylindrical rim structure 304 may be removed from the machine 100. The rim structure may be disassembled to separate a plurality of shoes forming the cylindrical rim structure at 604. For example, the cylindrical rim structure 304 may be disassembled to separate the plurality of shoes 302. At least one shoe may be disassembled at 606 to separate a shoe interface component with a shoe rim component. For example, the shoe 302 may be disassembled to separate the second segment 329 from the first segment 327. The shoe interface component may be replaced at 608 and connected to the original shoe rim component at 610. For example, the second segment 329 which may be worn or damaged may be replaced with a new second segment 329. The new second segment 329 may be connected to the original first segment 327 of the shoe 302. The cylindrical rim structure may be reassembled at 612 and reconnected to the machine at 614. For example, the plurality of shoes 302 may be reassembled to form the cylindrical rim structure 304 which may be reconnected to the machine 100.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

It should be noted that the term "example" or "exemplary" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

Variations of the embodiments described herein may become apparent to those of ordinary skill in the art upon reading the description. The inventors expect skilled artisans to employ such variations as appropriate, and the inventors intend for the embodiments to be practiced otherwise than as specifically described herein. Accordingly, this disclosure includes all modifications, embodiments and equivalents of the subject matter recited herein and in the claims appended hereto as permitted by applicable law. Any combination of the above-described elements in all possible variations thereof is encompassed by the disclosure unless otherwise indicated herein.

It is important to note that the construction and arrangement of the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. Additionally, it should be understood that features from one embodiment disclosed herein may be combined with features of other embodiments disclosed herein as one of ordinary skill in the art would understand. Other substitutions, modifications, changes and omissions may also be made in the design, operating conditions and arrangement of the various embodiments without departing from the scope of the present disclosure.

While this specification contains many specific implementation details, these should not be construed as limitations on the scope of any inventions or of what may be claimed, but rather as descriptions of features specific to particular implementations of particular inventions. Certain features described in this specification in the context of separate implementations can also be implemented in combination in a single implementation. Conversely, various features described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

The invention claimed is:

1. A machine for retreading tires, comprising:
a hub being rotatable with respect to the machine, the hub including a plurality of ribs;
an expandable rim disposed around the hub, the expandable rim including a plurality of shoes arranged around the hub, each of the plurality of shoes including a base portion and a rim portion, the base portion forming a channel that includes a ramp, the ramp slidably engaging a respective rib of the hub such that axial displacement of the hub causes the plurality of shoes to move in a radial direction with respect to the hub; and
a belt disposed along the rim portion of the plurality of shoes,
wherein the base portion of the plurality of shoes is formed by connecting a first segment and a second segment, the first segment of the base portion being connected to the rim portion, and the second segment being connectable to the first segment so as to form the channel and the ramp.

2. The machine of claim 1, wherein the expandable rim includes twelve shoes.

3. The machine of claim 1, wherein the base portion has a generally flat planar shape.

4. The machine of claim 3, wherein the base portion forms the channel at one end and is connected to the rim portion at an opposite end.

5. The machine of claim 1, wherein the channel is generally V-shaped and the ramp is formed as an edge along a bottom of the channel.

6. The machine of claim 1, wherein the machine is a buffing machine that is useable in tire retreading operations, the machine further comprising a rasp.

7. The machine of claim 1, wherein the rim portion includes a rim segment and a flange segment disposed on either side of the rim segment.

8. The machine of claim 1, wherein the first segment and the second segment are aligned to one another by two pins.

9. The machine of claim 1, wherein the first segment and the second segment are connected using at least one of fasteners, welding, pinning and keying structures.

10. The machine of claim 1, further comprising support plates arranged around the expandable rim.

11. The machine of claim 1, wherein the hub further comprises a conical element that is displaceable relative to the hub in an axial direction along a rotation axis.

12. The machine of claim 11, wherein the conical element forms the plurality of ribs.

13. A method for servicing a machine having an expandable rim, comprising:
  disassembling a cylindrical rim structure by separating one of a plurality of shoes from a hub of the cylindrical rim structure;
  disassembling the shoe into a first segment and a second segment, wherein the second segment is positioned radially inward relative to the first segment, the first segment being a rim component having a rim portion defining an outer drum surface, the second segment being an interface component having a channel configured to engage a portion of the hub, wherein the portion of the hub is a rib extending radially away from the hub and the channel is configured to slidably engage the rib;
  connecting a replacement second segment to the first segment;
  reassembling the cylindrical rim structure using the shoe having the replacement second segment; and
  reconnecting the cylindrical rim structure to the hub of the machine.

14. The method of claim 13, wherein reassembling the cylindrical rim structure includes arranging the plurality of shoes to form the cylindrical rim structure and positioning at least one belt around a cylinder formed by mating rim segments of individual shoes.

15. The method of claim 13, wherein connecting the replacement second segment to the first segment includes using at least one of fasteners, welding, pinning and keying processes.

16. The method of claim 13, wherein the second segment is replaced when becoming worn, while the first segment is reused.

17. A method for servicing a machine having an expandable rim, comprising:
  removing a rim structure from the machine;
  disassembling the rim structure to separate a plurality of shoes;
  disassembling at least one shoe so as to separate a shoe interface component from a shoe rim component;
  aligning a replacement shoe interface component to the previously separated shoe rim component and connecting the replacement shoe interface component to the shoe rim component to form a replacement shoe;
  reassembling the rim structure by rejoining the plurality of shoes using the replacement shoe interface component; and
  reconnecting the rim structure to the machine.

18. The method of claim 17, wherein reassembling the rim structure includes arranging the plurality of shoes to form the rim structure, and positioning at least one belt around a cylinder formed by mating rim segments of individual shoes.

19. The method of claim 17, wherein aligning and connecting the replacement shoe interface component to the shoe rim component that was previously removed from the machine includes connecting the shoe interface component and the replacement shoe interface component using at least one of fasteners, welding, pinning and keying processes.

20. The method of claim 17, wherein an original shoe interface component is replaced when becoming worn, while a remaining structure of the shoe is reused.

* * * * *